United States Patent [19]

Sato et al.

[11] Patent Number: 5,248,738

[45] Date of Patent: * Sep. 28, 1993

[54] VIBRATION-DAMPING RESIN MOLDED PRODUCTS FORMED OF A MIXTURE OF NYLON 6 RESIN, A XYLENE DIAMINE BASED NYLON RESIN, AND A NYLON 66 RESIN

[75] Inventors: Koichi Sato; Tadaoki Okumoto; Koji Sasaki; Hidetoshi Ishihara, all of Aichi, Japan

[73] Assignee: Toyoda Gosei Co., Ltd., Nishikasugai, Japan

[*] Notice: The portion of the term of this patent subsequent to Dec. 25, 2007 has been disclaimed.

[21] Appl. No.: 599,467

[22] Filed: Oct. 18, 1990

[30] Foreign Application Priority Data

Oct. 20, 1989 [JP] Japan .................................. 1-274488

[51] Int. Cl.$^5$ ............................................. C08L 77/00
[52] U.S. Cl. ...................................... 525/432; 525/420
[58] Field of Search ........................................ 525/432

[56] References Cited

U.S. PATENT DOCUMENTS

| | | | |
|---|---|---|---|
| 4,098,860 | 7/1978 | Etou et al. | 264/171 |
| 4,702,859 | 10/1987 | Shimizu et al. | 252/511 |
| 4,707,528 | 11/1987 | Koizumi et al. | 525/432 |
| 4,980,407 | 12/1990 | Okumoto et al. | 524/449 |

FOREIGN PATENT DOCUMENTS 53-120761 10/1978 Japan .
56-86950  7/1981 Japan .

*Primary Examiner*—Ana L. Carrillo
*Attorney, Agent, or Firm*—Cushman, Darby & Cushman

[57] ABSTRACT

A vibration-damping resin molded product which can be used as an engine part or attachment in a motor vehicle, the resin molded product being made of a blend of nylons comprising:

(A) 5 to 90% by weight, based on the total amount of the blend, of a nylon 6 resin, (B) 5 to 90% by weight, based on the total amount of the blend, of a xylylenediamine-based nylon resin, and (C) 5 to 90% by weight, based on the total amount of the blend, of a nylon 66 resin. Optionally, the resin molded product can contain an inorganic filler (D) in an amount of 10 to 150 parts by weight, per 100 parts by weight of the above-described blend of nylons.

4 Claims, 1 Drawing Sheet

VIBRATION-DAMPING RESIN MOLDED PRODUCTS FORMED OF A MIXTURE OF NYLON 6 RESIN, A XYLENE DIAMINE BASED NYLON RESIN, AND A NYLON 66 RESIN

BACKGROUND OF THE INVENTION

1. Field of the Invention

The present invention relates to a resin molded product, having excellent vibration-damping properties, which is useful as an engine part or attachment.

2. Description of the Prior Art

The substitution of plastic components and parts for metallic components and parts in the engines of motor vehicles, such as automobiles, has been a field of much interest in recent years due to the need for smaller fuel consumption in motor vehicles.

Nylon resin materials are superior to metallic materials with respect to providing light-weight products. In addition, nylon resin materials have various excellent characteristics with respect to vibration-damping properties, rigidity, heat resistance, oil resistance, and the like.

For this reason, nylon resins have recently been used in the production of engine parts and attachments, such as the cylinder head cover, gearcase, etc., in order to reduce the weight, as well as the noise, of the motor vehicle.

In general, resin materials are superior to metallic materials with respect to the vibration-damping performance of the components obtained therefrom. However, with regard to the noise reduction effect, the use of resinous components results in an increase in air-transmitted sounds due to the small specific gravities thereof, although solid-transmitted sounds (i.e., sounds caused by the vibration of the components themselves) are reduced. Therefore, in order to effectively reduce noise when replacing metallic components with resinous components, the resulting increase in air-transmitted noise must be more than counterbalanced by the reduction in solid-transmitted noise. In other words, resinous components are required to have an extremely high vibration-damping performance.

Resin materials generally possess high viscoelastic properties, with their vibration-damping effect being maximum around temperatures at which the dissipation factors (tan δ) of the mechanical dispersion, mainly due to the glass transition of the polymer materials, have maximal values. Such temperatures are usually 10° to 30° C. higher than the glass transition temperatures (Tg) measured by differential scanning calorimetry (DSC).

For example, straight-chain aliphatic nylons such as nylon 6, nylon 66, nylon 12, nylon 11, and nylon 610 have a glass transition temperature (Tg) of from about 40° to about 60° C., and their vibration-damping performance is maximum at a Tg of from about 60° to 80° C.

Aromatic nylons such as crystalline m-xylylenediamine-based resin (MXD nylon), which has aromatic rings in its molecular chains, and a copolymer of one or more diamines and one or more dicarboxylic acids (e.g., terephthalic acid and isophthalic acid), which is a non-crystalline nylon, have a Tg of 120° C. or more, with their vibration-damping effect being maximum at temperatures as high as 130° C. or more.

In addition to the requirement that automobiles be light weight, there is a growing demand that automobiles be more comfortable. One factor that contributes to an improvement in comfort is the reduction of vibration noise. Such vibration noise can be attributed to the vibration of engine parts as well as various resinous molded products (examples of which are set forth below) which are attached to the engine and engine parts by bolts, nuts, screws, etc., with the vibrations of these products being induced by the vibration of the engine.

Since the resinous molded products are located around the engine and thus are generally heated to a temperature in the range of 80° to 120° C., they must have excellent vibration-damping properties, especially in that temperature range.

SUMMARY OF THE INVENTION

Bearing the foregoing in mind, an object of the present invention is to provide a nylon resin molded product which has excellent vibration-damping properties, particularly at a temperature in the range of 80° to 120° C., thus eliminating the problems encountered by the prior art.

This object is accomplished by the provision of a vibration-damping resin molded product useful as an engine part or attachment in a motor vehicle, the resin molded product being made of a blend of nylons comprising a nylon 6 resin, a xylylenediamine-based nylon resin, and a nylon 66 resin.

Optionally, an inorganic filler can be blended with the above-described blend of nylons.

DETAILED DESCRIPTION OF THE INVENTION

Figure 1:
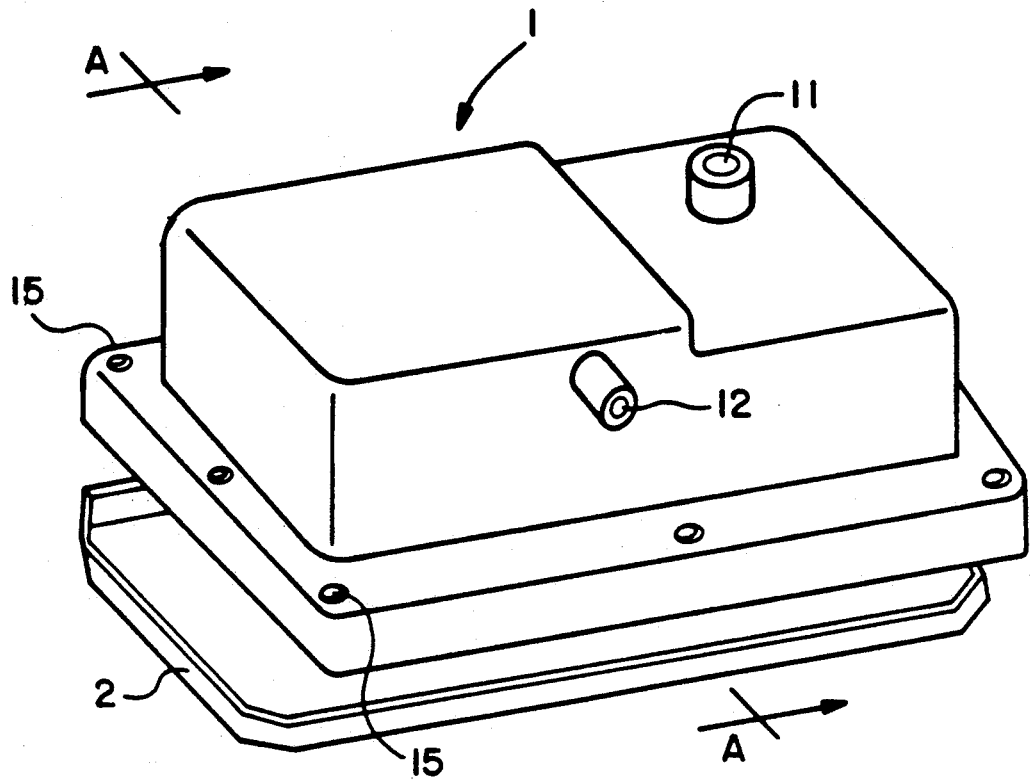
FIG. 1 is a perspective view of the cylinder head cover obtained in Example 22 below.

The vibration-damping resin molded product according to the present invention is useful as an engine part or attachment in a motor vehicle, such as an automobile, and is made of a blend of nylons comprising:

(A) 5 to 90% by weight, based on the total amount of the blend, of a nylon 6 resin, (B) 5 to 90% by weight, based on the total amount of the blend, of a xylylenediamine-based nylon resin, and (C) 5 to 90% by weight, based on the total amount of the blend, of a nylon 66 resin.

The nylon 6 resin (A) is a polyamide which contains at least 90 mol % of caprolactam units and may contain other comonomer units such as, for example, ω-laurolactam units. There are no particular limits on the molecular weight, or viscosity, of the nylon 6 resin. However, the molecular weight preferably falls in a range such that the resulting blend can be molded under the usual molding conditions.

The xylylenediamine-based nylon resin (B) is a crystalline nylon resin made up of xylylenediamine units and aliphatic, straight-chain dibasic acid units. The xylylenediamine can be m-xylylenediamine, p-xylylenediamine, or a mixture thereof. Examples of the aliphatic, straight-chain dibasic acid include adipic acid, sebacic acid, suberic acid, azelaic acid, $HOOC(CH_2)_{10}COOH$, and the like.

Particularly preferred examples of the nylon resin (B) include nylon MXD6, consisting primarily of m-xylylenediamine units and adipic acid salt units.

The nylon 66 resin (C) is a polyamide containing at least 90 mol % of hexamethyleneadipamide units and can contain other comonomer units such as, for example, ω-laurolactam units. There are no particular limits on the molecular weight, or viscosity, of the nylon 66 resin. However, the molecular weight preferably falls in a range such that the resulting blend can be molded under the usual molding conditions.

The resin molded product contains nylon 6 resin (A) in an amount of from 5 to 90% by weight, and preferably from 50 to 90% by weight, based on the total amount of the blend of nylons making up the resin molded product. If the amount is less than 5% by weight, a well-balanced improvement in vibration-damping properties throughout the temperature range of 80° to 120° C. cannot be obtained. If, on the other hand, the amount exceeds 90% by weight, almost no improvement in vibration-damping properties is obtained.

The resin molded product contains the xylylenediamine-based nylon resin (B) in an amount of from 5 to 90% by weight, and preferably from 5 to 50% by weight, based on the total amount of the blend of nylons making up the resin molded product. If the amount is less than 5% by weight, the improvement in vibration-damping properties is insufficient. If, on the other hand, the amount exceeds 90% by weight, an improvment in vibration-damping properties cannot be obtained at a temperature in the range of 80° to 100° C.

The resin molded product contains the nylon 66 resin (C) in an amount of from 5 to 90% by weight, and preferably from 5 to 50% by weight, based on the total amount of the blend of nylons making up the resin molded product. If the amount is less than 5% by weight or greater than 90% by weight, the improvement in vibration-damping properties is insufficient.

In another embodiment of the invention, the resin molded product comprises:

100 parts by weight of a blend of nylons comprising
(A) 5 to 90% by weight, based on the total amount of the blend, of a nylon 6 resin,
(B) 5 to 90% by weight, based on the total amount of the blend, of a xylylenediamine-based nylon resin, and
(C) 5 to 90% by weight, based on the total amount of the blend, of a nylon 66 resin; and blended with the above-described blend of nylons (A), (B) and (C),
(D) 10 to 150 parts by weight of an inorganic filler.

The resin molded product can contain the inorganic filler (D) in an amount of from 10 to 150 parts by weight, and preferably in an amount of from 20 to 80 parts by weight, per 100 parts by weight of the blend of nylons. The incorporation of component (D) into the blend improves the mechanical strength of the resulting resin molded product.

If the resin molded product contains the inorganic filler (D) in an amount of less than 10 parts by weight, the filler cannot effectively improve the mechanical strength of the resulting molded product, while an amount of inorganic filler (D) exceeding 150 parts by weight results in poor moldability and impairs the surface gloss of the resulting molded product.

Examples of the inorganic filler (D) include glass fibers, mica, talc, wollastonite, barium sulfate, clay, calcium carbonate, carbon fibers, silicon carbide fibers, potassium titanate whiskers, and calcium sulfate whiskers. These may be used singly or in combination.

Of these, glass fibers or a combination of glass fibers and mica are most preferred as the inorganic filler (D) because they show marked reinforcing effects.

The glass fibers which can be used as the inorganic filler (D) include those used in conventional glass fiber-reinforced resins. The fibers are not particularly limited in shape; thus, fibers with any shape can be used. Examples of glass fibers include long fibers such as glass rovings, and short fibers such as chopped strands and milled fibers. An especially preferred example of glass fibers which can be included in the blend are those which have been surface-treated with a silane coupling agent, a titanate coupling agent, or the like.

The nylon blend employed in the present invention can be prepared, for example, by kneading the components (A), (B), and (C) in predetermined proportions, each in the form of pellets, powder, etc., using a tumbling blender, Henschel mixer, ribbon mixer, or the like.

In admixing an inorganic filler (D) with the thus-obtained nylon blend, the inorganic filler and nylon blend are both melt-kneaded according to conventional methods using a kneading machine such as, for example, a single axial-screw extruder, biaxial-screw extruder, kneader, or Banbury mixer. One or both of the components (A), (B) and (C) may be fed during kneading in the form of pellets or powder or in a melted form. Various other conventional mixing techniques may also be used.

According to the present invention, various additives and other materials can be included in the composition obtained above, as long as the additives, etc., do not impair the moldability of the composition and the physical properties of the resulting resin molded product. For example, an antioxidant, an ultraviolet absorber, a lubricant, an antistatic agent, a nucleating agent, a mold-releasing agent, a plasticizer, a pigment, a flame retarder, an extender and other resin materials may be added to the resin composition, either singly or in combination.

The resin composition obtained as described above is molded into a resin product having the desired shape and structure, using an injection molding machine or other molding machine known in the art.

The vibration-damping resin molded product prepared according to the present invention can be used as an engine part or attachment. Examples of such resin molded products include a cylinder head cover, gear cover, timing belt cover, oil pan, transmission cover, air cleaner case, resonator, exhaust pipe, and the like.

As described above, the resin molded product according to the present invention is prepared by blending the above-described nylon ingredients (A), (B), and (C) in the respective proportions specified above. Due to this specific composition, the resultant resin molded product has an excellent vibration-damping effect, particularly at temperatures in the range of 80° to 120° C.

When an inorganic filler is included in the above-described blend in the amount specified above and the resulting composition is used to produce a vibration-damping resin molded product, the resin molded product has superior mechanical strength, as well as excellent vibration-damping properties.

The present invention will be described in greater detail below by reference to the following Examples and Comparative Examples; however, the Examples should not be construed as limiting the scope of the invention.

EXAMPLES 1-6 AND 11-21, AND COMPARATIVE EXAMPLES 1-6

Preparation of Test Samples:

With respect to each of the resin compositions of the Examples and Comparative Examples, the nylon ingredients shown in Tables 1, 2-1, and 2-2 were first mixed for 5 minutes using a tumbling blender, then melt-kneaded. The resulting blend was then pelletized.

When an inorganic filler was added to the obtained blend, the nylon blend and the inorganic filler were separately fed into a biaxial-screw extruder (length L, diameter D: 27, 30 mm; rotating in opposite directions) in such a way that the nylon blend was supplied at the lowermost part, i.e., the end, of the screws and the filler was supplied at the middle of the screws. The nylon blend and filler thus fed were melt-kneaded and then pelletized.

The pellets obtained above according to each formulation were dried in a hot air oven at 100° C. for 8 hours, and then formed into test samples of predetermined shapes and sizes using an injection molding method.

The thus-prepared test samples were annealed at 100° C. under vacuum for 8 hours, following which the dissipation factor (a measure of the vibration damping performance) and the flexural modulus of elasticity of the test samples were measured as follows:

(1) Dissipation Factor:

Test sample: 150 mm × 150 mm, thickness 3 mm.

Measuring method: In a constant-temperature bath (using a thermostat), the center of the test sample was vibrated at 0.1 G and the transfer function was measured. From the secondary resonance point, the dissipation factor $\eta$ was calculated using the half value width method.

(2) Flexural Modulus of Elasticity: measured in accordance with the ASTM D790 method.

In Tables 1 and 2 below, the amount of each of the nylon components (A), (B), and (C) for each formulation is given in terms of wt % based on the total amount of the nylon blend, while the amount of component (D) (the inorganic filler) is given in terms of parts by weight per 100 parts by weight of the nylon blend.

TABLE 1

| | | Example 1 | Example 2 | Example 3 | Example 4 | Example 5 | Example 6 | Comp. Example 1 | Comp. Example 2 | Comp. Example 3 |
|---|---|---|---|---|---|---|---|---|---|---|
| Formulation | A Nylon 6 resin | 60 | 40 | 20 | 40 | 20 | 20 | 100 | | |
| | B Xylylenediamine-based nylon resin | 20 | 40 | 60 | 20 | 40 | 20 | | 100 | |
| | C Nylon 66 resin | 20 | 20 | 20 | 40 | 40 | 60 | | | 100 |
| Dissipation factor ($\eta$) | 80° C. | 0.188 | 0.157 | 0.100 | 0.167 | 0.124 | 0.152 | 0.122 | 0.011 | 0.126 |
| | 100° C. | 0.142 | 0.186 | 0.204 | 0.152 | 0.172 | 0.150 | 0.076 | 0.070 | 0.128 |
| | 120° C. | 0.075 | 0.097 | 0.159 | 0.085 | 0.111 | 0.081 | 0.048 | 0.212 | 0.008 |
| Flexural modulus of elasticity) (kg/cm$^2$) | | 31600 | 32700 | 37100 | 31800 | 32500 | 31400 | 28400 | 33000 | 29000 |

TABLE 2

| | | Example 11 | Example 12 | Example 13 | Example 14 | Example 15 | Comp. Example 4 | Comp. Example 5 | Comp. Example 6 |
|---|---|---|---|---|---|---|---|---|---|
| Formulation | A Nylon 6 resin | 80 | 10 | 10 | 60 | 60 | 100 | | |
| | B Xylylenediamine-based nylon resin | 10 | 80 | 10 | 20 | 20 | | 100 | |
| | C Nylon 66 resin | 10 | 10 | 80 | 20 | 20 | | | 100 |
| | D Glass fiber | 43 | 43 | 43 | 25 | 43 | 43 | 43 | 43 |
| | Mica | | | | | | | | |
| Dissipation factor ($\eta$) | 80° C. | 0.082 | 0.033 | 0.069 | 0.110 | 0.102 | 0.069 | 0.006 | 0.066 |
| | 100° C. | 0.063 | 0.095 | 0.081 | 0.087 | 0.078 | 0.041 | 0.036 | 0.058 |
| | 120° C. | 0.032 | 0.113 | 0.033 | 0.053 | 0.041 | 0.030 | 0.212 | 0.004 |
| Flexural modulus of elasticity (kg/cm$^2$) | | 83000 | 105000 | 86000 | 64000 | 85000 | 80000 | 110000 | 86000 |

| | | Example 16 | Example 17 | Example 18 | Example 19 | Example 20 | Example 21 |
|---|---|---|---|---|---|---|---|
| Formulation | A Nylon 6 resin | 60 | 60 | 60 | 20 | 20 | 40 |
| | B Xylylenediamine-based nylon resin | 20 | 20 | 20 | 60 | 20 | 30 |
| | C Nylon 66 resin | 20 | 20 | 20 | 20 | 60 | 30 |
| | D Glass fiber | 67 | 100 | 33.5 | 43 | 43 | 43 |
| | Mica | | | 33.5 | | | |
| Dissipation factor ($\eta$) | 80° C. | 0.097 | 0.092 | 0.120 | 0.054 | 0.083 | 0.089 |
| | 100° C. | 0.074 | 0.070 | 0.096 | 0.106 | 0.084 | 0.090 |
| | 120° C. | 0.035 | 0.030 | 0.052 | 0.075 | 0.045 | 0.051 |
| Flexural modulus of elasticity (kg/cm$^2$) | | 116000 | 145000 | 110000 | 102000 | 88000 | 93000 |

The ingredients used in the above resin compositions of the Examples and Comparative Examples were as follows:

Nylon 6 resin: GRILON A28 (EMS)

Xylylenediamine-based nylon resin: Nylon MXD-6 [T-600 (manufactured by Toyobo Co., Ltd., Japan)]

Nylon 66 resin: GRILON T-300GM (EMS)

Glass fiber: CS 03 MA FT-2 (manufactured by Asahi Fiber Glass Co., Ltd., Japan)

Mica: S-325 (manufactured by REPCO)

As may be seen from the results in Table 1, the resin molded products of Examples 1 to 6 (having resin compositions prepared according to the present invention) each have excellent vibration-damping performances, as compared to the vibration-damping performances of the resin compositions of Comparative Examples 1 to 3, each of which employs a single nylon resin.

As shown by the results in Tables 2-1 and 2-2, the resin molded products of Examples 11 to 21, in which an inorganic filler has been incorporated, have even higher mechanical strengths than the resin molded products of Examples 1 to 6, shown in Table 1.

As demonstrated above, the resin molded products of the present invention show excellent vibration-damping performances, particularly in the high temperature range of from 80° to 120° C. In addition, the resin molded products of the present invention, in which an inorganic filler has been included, have significantly improved mechanical strength.

EXAMPLE 22

A cylinder head cover formed from a nylon blend prepared according to the present invention is described below.

Figure 2:
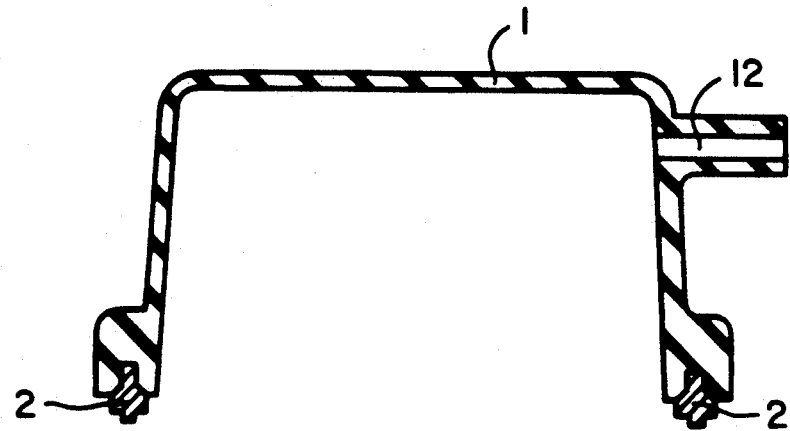
FIG. 2 is a cross-sectional view taken along line A—A of FIG. 1.

As shown in FIGS. 1 and 2, the cylinder head cover consists of a cylinder head cover 1 and a gasket 2 which is made of a heat-resistant rubber and attached to the lower edge of the cylinder head cover 1. The cylinder head cover 1 has the shape of a box with its lower side open, and has an oil feed opening 11 on its upper side and a nozzle 12 for EGR on its side wall. The cylinder head cover 1 also has, in the lower part of its side walls, bolt holes 15 for attaching the cylinder head cover to an engine.

The above-described cylinder head cover 1 can be used in a diesel engine, and was prepared using each of the compositions prepared in Example 15 and Comparative Example 4 above by a injection molding method conducted at a cylinder temperature of about 290° C. and a mold temperature of about 80° C. Each of the thus-obtained cylinder head covers had a length of 48 cm, a width of 25 cm, a depth of 8 cm, and a thickness of 0.4 cm.

Each of the cylinder head covers was attached to an engine and subjected to a bench test under identical conditions. The noise level was measured, with a microphone being placed at a distance of 100 cm from the cylinder head cover. At the time the noise level was measured, the temperature of the cylinder head cover was about 100° C.

The results show that the noise level of the cylinder head cover formed from the composition of Example 15 was lower by about 1 to 2 dB (decibel) than that of the cylinder head cover formed from the composition of Comparative Example 4.

While the invention has been described in detail and with reference to specific embodiments thereof, it will be apparent to one skilled in the art that various changes and modifications can be made therein without departing from the spirit and scope of the invention.

What is claimed is:

1. A vibration-damping resin molded product useful as an engine part or attachment, said resin molded product being made of a blend of nylons comprising:
   (A) 5 to 90% by weight, based on the total amount of the blend, of a nylon 6 resin,
   (B) 5 to 90% by weight, based on the total amount of the blend, of a xylylenediamine-based nylon resin, and
   (C) 5 to 90% by weight, based on the total amount of the blend, of a nylon 66 resin.

2. The vibration-damping resin molded product as in claim 1, wherein said xylylenediamine-based nylon resin (B) comprises m-xylylendiamine, p-xylylenediamine or a mixture thereof.

3. The vibration-damping resin molded product as in claim 1, wherein said xylylenediamine-based nylon resin (B) comprises an aliphatic, straight-chain dibasic acid which is selected from the group consisting of adipic acid, sebacic acid, suberic acid, azelaic acid and $HOOC(CH_2)_{10}COOH$.

4. The vibration-damping resin molded product as in claim 1, wherein said xylylenediamine-based nylon resin (B) is nylon MXD6.

* * * * *